(12) United States Patent
Chen et al.

(10) Patent No.: US 6,768,555 B2
(45) Date of Patent: Jul. 27, 2004

(54) FABRY-PEROT FILTER APPARATUS WITH ENHANCED OPTICAL DISCRIMINATION

(75) Inventors: Li-Jui Chen, Hsinchu (TW); Ran-Jin Lin, Hsin-Chu (TW)

(73) Assignee: Industrial Technology Research Institute, Hsin Chu (TW)

( * ) Notice: Subject to any disclaimer, the term of this patent is extended or adjusted under 35 U.S.C. 154(b) by 215 days.

(21) Appl. No.: 10/103,619

(22) Filed: Mar. 21, 2002

(65) Prior Publication Data

US 2003/0179383 A1 Sep. 25, 2003

(51) Int. Cl.[7] .................................................. G01B 9/02
(52) U.S. Cl. ..................................................... 356/519
(58) Field of Search ................................. 356/454, 480, 356/519, 337.2, 337.22, 577, 589; 372/32

(56) References Cited

U.S. PATENT DOCUMENTS 5,151,585 A * 9/1992 Siebert ..................... 250/201.9
6,031,653 A * 2/2000 Wang .......................... 359/247

* cited by examiner

Primary Examiner—Samuel A. Turner
Assistant Examiner—Michael A. Lyons
(74) Attorney, Agent, or Firm—Tung & Associates

(57) ABSTRACT

Within a Fabry-Perot filter apparatus, a method for fabricating the Fabry-Perot filter apparatus and a method for operating the Fabry-Perot filter apparatus, there is employed a Fabry-Perot filter and at least one color filter layer, both assembled over a substrate and covering at least two optical transducer elements which are formed within the substrate. Within the foregoing apparatus and methods, the at least one color filter layer comprises at least two color filter elements of separate color, each registered with a separate optical transducer element within the at least two optical transducer elements. The apparatus and methods provide for enhanced optical discrimination properties.

22 Claims, 2 Drawing Sheets

FABRY-PEROT FILTER APPARATUS WITH ENHANCED OPTICAL DISCRIMINATION

BACKGROUND OF THE INVENTION

1. Field of the Invention

The present invention relates generally to Fabry-Perot filter apparatus. More particularly, the present invention relates to Fabry-Perot filter apparatus with enhanced performance.

2. Description of the Related Art

Fabry-Perot filters are optical interference filters which may be employed to provide desirable optical properties within both optical sensing applications and optical emission applications. Particularly common applications of Fabry-Perot filters, but by no means exclusive applications of Fabry-Perot filters, are as optical components within optical spectrophotometric apparatus for analysis of samples of various compositions.

While Fabry-Perot filters are thus clearly desirable as optical components within optical apparatus employed within various applications, Fabry-Perot filters are nonetheless not entirely without problems.

In that regard, Fabry-Perot filters are often difficult to efficiently fabricate with enhanced optical discrimination properties.

It is thus desirable within the art of Fabry-Perot filter fabrication to provide Fabry-Perot filter apparatus which may be fabricated with enhanced performance, and in particular enhanced optical discrimination properties.

It is towards the foregoing object that the present invention is directed.

Various Fabry-Perot filter apparatus having desirable properties have been disclosed within the art of Fabry-Perot filter apparatus fabrication.

Included among the Fabry-Perot filter apparatus, but not limiting among the Fabry-Perot filter apparatus, are Fabry-Perot filter apparatus disclosed within: (1) Katagiri et al., in U.S. Pat. No. 4,859,060 (a Fabry-Perot filter apparatus with tunable interferometric properties, by fabricating the Fabry-Perot filter apparatus such that a separation distance of a pair of partially reflective layers within the Fabry-Perot filter apparatus may be varied); (2) Zochbauer, in U.S. Pat. No. 5,357,340 (a Fabry-Perot filter apparatus with enhanced optical properties by employing within the Fabry-Perot filter apparatus a pair of Fabry-Perot filters rather than a single Fabry-Perot filter); (3) Cole et al., in U.S. Pat. No. 5,550,373 (a Fabry-Perot filter apparatus with enhanced optical performance incident to being fabricated with a microlens layer in conjunction with a Fabry-Perot filter); and (4) Lehto et al, in U.S. Pat. No. 5,818,586 (an additional Fabry-Perot filter apparatus with tunable interferometric properties, by fabricating the Fabry-Perot filter apparatus such that a separation distance of a pair of partially reflective layers within the Fabry-Perot filter apparatus may be varied).

Similarly, although not specifically directed towards Fabry-Perot filter apparatus, Okamoto, in U.S. Pat. No. 6,094,272, discloses a distance tolerant color discriminating apparatus which provides for measurement of reflection or transmission of at least two colors of red, green and blue, with respect a sample whose color it is desired to discriminate.

The disclosures of each of the foregoing related art references is incorporated herein fully by reference.

Desirable in the art of Fabry-Perot filter apparatus fabrication are additional Fabry-Perot filter apparatus which may be fabricated with enhanced performance, and in particular enhanced optical discrimination properties.

It is towards the foregoing object that the present invention is directed.

SUMMARY OF THE INVENTION

A first object of the present invention is to provide a Fabry-Perot filter apparatus, a method for fabricating the Fabry-Perot filter apparatus and a method for operating the Fabry-Perot filter apparatus.

A second object of the present invention is to provide the Fabry-Perot filter apparatus, the method for fabricating the Fabry-Perot filter apparatus and the method for operating the Fabry-Perot filter apparatus in accord with the first object of the present invention, wherein the Fabry-Perot filter apparatus is fabricated with enhanced performance.

In accord with the objects of the present invention, there is provided by the present invention a Fabry-Perot filter apparatus, a method for fabricating the Fabry-Perot filter apparatus and a method for operating the Fabry-Perot filter apparatus.

In accord with the present invention, the Fabry-Perot filter apparatus comprises in a first instance a substrate having formed therein at least two optical transducer elements. The Fabry-Perot filter apparatus comprises in a second instance a Fabry-Perot filter assembled over the substrate and covering the at least two optical transducer elements, where the Fabry-Perot filter comprises a pair of partially reflective layers separated by a transparent material. Finally, the Fabry-Perot filter apparatus comprises in a third instance at least one color filter layer also assembled over the substrate and covering the at least two optical transducer elements, where the at least one color filter layer comprises at least two color filter elements of separate color, each registered with a separate optical transducer element within the at least two optical transducer elements.

The Fabry-Perot filter apparatus in accord with the present invention contemplates the method for fabricating the Fabry-Perot filter apparatus in accord with the present invention and the method for operating the Fabry-Perot filter apparatus in accord with the present invention.

The present invention provides a Fabry-Perot filter apparatus, a method for fabricating the Fabry-Perot filter apparatus and a method for operating the Fabry-Perot filter apparatus, wherein the Fabry-Perot filter apparatus is fabricated with enhanced performance, and in particular enhanced optical discrimination properties.

The present invention realizes the foregoing object by assembling over a substrate employed within the Fabry-Perot filter apparatus, and in conjunction with a Fabry-Perot filter also assembled over the substrate, at least one color filter layer which covers at least two optical transducer elements also formed within the substrate. Within the Fabry-Perot filter apparatus, the at least one color filter layer comprises at least two color filter elements of separate color, each registered with a separate optical transducer element within the at least two optical transducer elements. Within the Fabry-Perot filter apparatus of the present invention the presence of the color filter layer, in particular, provides for enhanced optical discrimination properties within the Fabry-Perot filter apparatus.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention provides a Fabry-Perot filter apparatus, a method for fabricating the Fabry-Perot filter apparatus and a method for operating the Fabry-Perot filter apparatus, wherein the Fabry-Perot filter apparatus is fabricated with enhanced performance, and in particular enhanced optical discrimination properties.

The present invention realizes the foregoing object by assembling over a substrate employed within the Fabry-Perot filter apparatus, and in conjunction with a Fabry-Perot filter also assembled over the substrate, at least one color filter layer which covers at least two optical transducer elements also formed within the substrate. Within the Fabry-Perot filter apparatus, the at least one color filter layer comprises at least two color filter elements of separate color, each registered with a separate optical transducer element within the at least two optical transducer elements. Within the Fabry-Perot filter apparatus of the present invention the presence of the color filter layer, in particular, provides for enhanced optical discrimination properties of the Fabry-Perot filter apparatus.

Although the preferred embodiment of the present invention illustrates the present invention most particularly within the context of a direct illumination and sensing Fabry-Perot filter apparatus employing a series of photodiodes formed within a semiconductor substrate, the present invention is not intended to be limited to a direct illumination and sensing Fabry-Perot filter apparatus so fabricated. Rather, a Fabry-Perot filter apparatus in accord with the present invention may be fabricated employing substrates other than semiconductor substrates, and employ photoactive phototransducer devices, including photoreceptors and photoemitters, other than photodiodes. Similarly, a Fabry-Perot filter apparatus in accord with the present invention may be fabricated for use in direct illumination and sensing applications(i.e., absorption and transmission spectrophotometric applications), as well as indirect illumination and sensing applications (i.e., fluorescence spectrophotometric applications).

Figure 1:
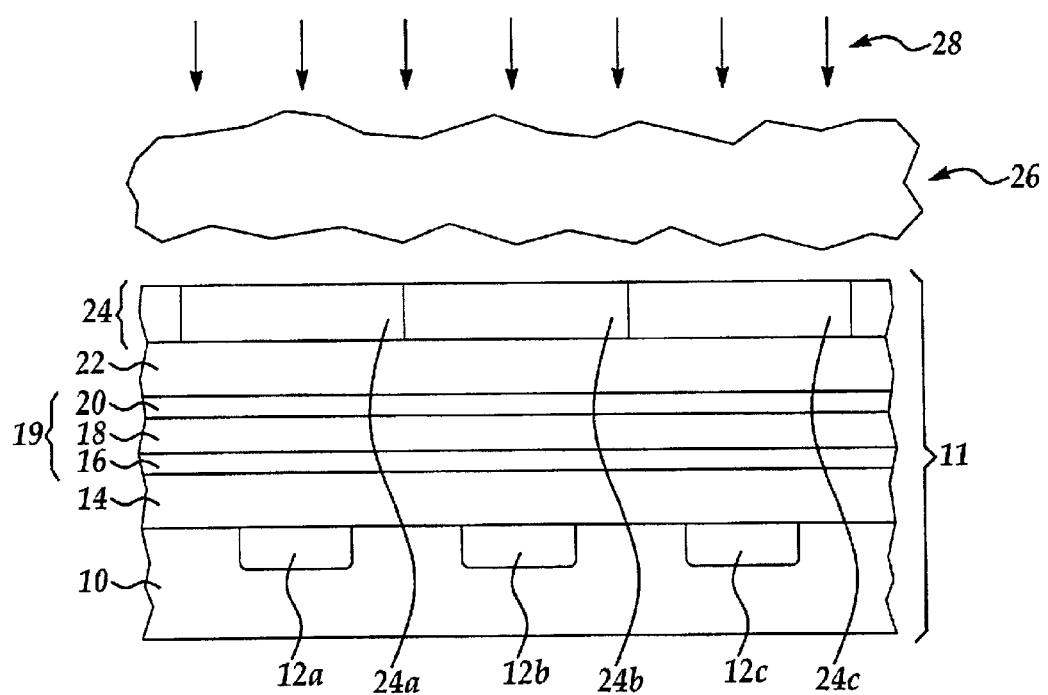
FIG. 1 shows a schematic cross-sectional diagram of a Fabry-Perot filter apparatus in accord with a preferred embodiment of the present invention.

Referring now to FIG. 1, there is shown a schematic cross-sectional diagram illustrating a Fabry-Perot filter apparatus fabricated in accord with a preferred embodiment of the present invention.

Shown in FIG. 1, in a first instance, is generally a Fabry-Perot filter apparatus 11 comprising, in a first instance, a semiconductor substrate 10 having formed therein a series of photodiodes 12a, 12b and 12c.

Within the preferred embodiment of the present invention with respect to the semiconductor substrate 10, and although semiconductor substrates are known in the art of semiconductor integrated circuit microelectronic fabrication with either dopant polarity, various dopant concentrations and several crystallographic orientations, for the preferred embodiment of the present invention, the semiconductor substrate 10 is typically and preferably a (100) silicon semiconductor substrate having either an N- or P-dopant concentration.

Similarly, within the preferred embodiment of the present invention with respect to the series of photodiodes 12a, 12b and 12c, the series of photodiodes 12a, 12b and 12c is similarly also conventional in the art of semiconductor integrated circuit microelectronic fabrication, and formed incident to implanting into the semiconductor substrate 10 a series of regions of generally higher dopant concentration and opposite dopant polarity, when viewed in comparison with the semiconductor substrate 10. Within the preferred embodiment of the present invention, each of the series of photodiodes 12a, 12b and 12c typically and preferably has a linewidth of from about 10 to about 2000 microns.

Shown also within the schematic cross-sectional diagram of FIG. 1 is a first spacer layer 14 and a second spacer layer 22, each formed over the semiconductor substrate 10, including the series of photodiodes 12a, 12b and 12c, although within the present invention there need be only a minimum of two photoactive phototransducer regions, such as photodiodes, to provide in part a Fabry-Perot filter apparatus in accord with the present invention.

Within the preferred embodiment of the present invention with respect to the first spacer layer 14 and the second spacer layer 22, each of the first spacer layer 14 and the second spacer layer 22 may be formed of spacer materials as are conventional in the art of semiconductor integrated circuit microelectronic fabrication, and in particular of spacer materials that are transparent to radiation whose intensity is detected and classified by the series of photodiodes 12a, 12b and 12c when operating the Fabry-Perot transducer element whose schematic cross-sectional diagram is illustrated in FIG. 1.

Within the preferred embodiment of the present invention, each of the first spacer layer 14 and the second spacer layer 22 is typically and preferably formed of a silicon oxide dielectric material, formed to a thickness of from about 0 to about 10 micrometers, although other materials and thicknesses may also be employed within a Fabry-Perot filter apparatus in accord with the present invention.

Shown also within the schematic cross-sectional diagram of FIG. 1, and formed sandwiched interposed between the fist spacer layer 14 and the second spacer layer 22, is a Fabry-Perot filter 19 which comprises a first partially reflective layer 16 separated from a second partially reflective layer 20 by an interferometric spacer layer 18.

Within the preferred embodiment of the present invention with respect to the interferometric spacer layer 18, the interferometric spacer layer 18 may be formed employing methods and materials as are employed for forming the first spacer layer 14 and the second spacer layer 22, but the interferometric spacer layer 18 will typically and preferably be fabricated in accord with stringent dimensional tolerances to provide the Fabry-Perot filter 19 within the Fabry-Perot filter apparatus in accord with the preferred embodiment of the present invention. Typically and preferably, the interferometric spacer layer 22 is formed to a selected thickness in a range of from about 100 to about 50000 angstroms, and also formed of a silicon oxide dielectric material.

Within the preferred embodiment of the present invention with respect to the first partially reflective layer 16 and the second partially reflective layer 20, the first partially reflective layer 16 and the second partially reflective layer 20 may be formed from any of several reflective materials as are conventional in the art of semiconductor integrated circuit microelectronic fabrication, but employed within a thickness range such as to provide partially reflective properties to the reflective materials. Typically and preferably such reflective materials will be metal materials, such as but not limited to aluminum, silver and gold metal materials. Typically and preferably, each of the first partially reflective layer 16 and the second partially reflective layer 20 is formed of a silver reflective metal material, formed to a thickness of from about 100 to about 600 angstroms.

Finally, there is shown within the schematic cross-sectional diagram of FIG. 1, and formed upon the second spacer layer 22, a color filter layer 24, which completes the fabrication of the Fabry-Perot filter apparatus 11 in accord with the preferred embodiment of the present invention.

Within the preferred embodiment of the present invention with respect to the color filter layer 24, the color filter layer 24 comprises three color filter elements 24a, 24b and 24c of separate color, although in general within the present invention a color filter layer need be provided with only a minimum of two color filter elements of separate color. Similarly, within the present invention and the preferred embodiment of the present invention, each of the color filter elements 24a, 24b and 24c within the color filter layer 24 is registered with a corresponding photodiode 12a, 12b or 12c within the series of photodiodes 12a, 12b and 12c. Thus, inherently within FIG. 1 there is a single fixed actual separation distance between each one of the color filter elements 24a, 24b or 24c and a corresponding one of the photodiodes 12a, 12b or 12c.

Within the preferred embodiment of the present invention with respect to the color filter layer 24, the color filter layer 24 may be formed employing color filter materials as are conventional in the art of microelectronic fabrication. Typically and preferably, the series of color filter elements 24a, 24b and 24c within the color filter layer 24 is formed employing a series of separately colored patterned photoresist layers, although other colored layers may also be employed. Within the preferred embodiment of the present invention, the series of color filter elements 24a, 24b and 24c typically and preferably comprises a series of red, green and blue transmissive color filter elements, although the present invention is not specifically limited to only a series of red, green and blue transmissive color filter elements 24a, 24b and 24c.

Finally, there is also shown within the schematic cross-sectional diagram of FIG. 1 a sample media 26 through which passes an illuminating radiation beam 28, which is ultimately sensed by the series of photodiodes 12a, 12b and 12c.

Within the preferred embodiment of the present invention with respect to the sample media 26, the sample media 26 may be a liquid, a gas, a solid or a mixture thereof, as is otherwise generally conventional, or otherwise subject to analysis while employing a Fabry-Perot filter apparatus.

Within the preferred embodiment of the present invention with respect to the radiation beam 28, the radiation beam 28 may be supplied while employing any of several radiation sources as are otherwise generally known in the art, and appropriate to analysis of the sample media 26. Typically and preferably, but not exclusively, the radiation beam 28 will derive from a white light visible light radiation source.

As is understood by a person skilled in the art, and within the context of operation of the Fabry-Perot filter apparatus whose schematic cross-sectional diagram is illustrated in FIG. 1, the radiation beam 28, sample media 26 and color filter elements 24a, 24b and 24c are selected such as to allow for enhanced wavelength discrimination, and thus also enhanced precision and sensitivity, when analyzing the sample media 26.

Similarly, and as is also understood by a person skilled in the art, and although not specifically illustrated within the context of the schematic cross-sectional diagram of FIG. 1, the Fabry-Perot filter apparatus 11 whose schematic cross-sectional diagram is illustrated in FIG. 1 is typically and preferably fabricated in its entirety while employing semiconductor integrated circuit microelectronic fabrication methods and materials as are otherwise generally conventional in the art of semiconductor integrated circuit microelectronic fabrication. Such semiconductor integrated circuit microelectronic fabrication methods may also be employed for fabricating within a Fabry-Perot filter apparatus in accord with the present invention sample containment structures for containing samples, such as the sample media 26, within the Fabry-Perot filter apparatus.

Further, although the preferred embodiment of the present invention illustrates the present invention within the context of a Fabry-Perot filter apparatus having a Fabry-Perot filter assembled closer to a substrate than a color filter layer, a reverse ordering of a Fabry-Perot filter and a color filter layer with respect to a substrate is also intended to be within the context of a Fabry-Perot filter apparatus of the present invention.

Finally, and as is also understood by a person skilled in the art, while the Fabry-Perot filter apparatus 11 as illustrated within the schematic cross-sectional diagram of FIG. 1 is illustrated within the context of a fixed dimension interferometric spacer layer 18, a Fabry-Perot filter apparatus in accord with the present invention may also be fabricated and assembled such as to provide tunable interferometric characteristics in accord with Fabry-Perot filter apparatus as disclosed within the Description of the Related Art, all of which related art is again incorporated herein fully by reference.

EXAMPLE

Figure 2:
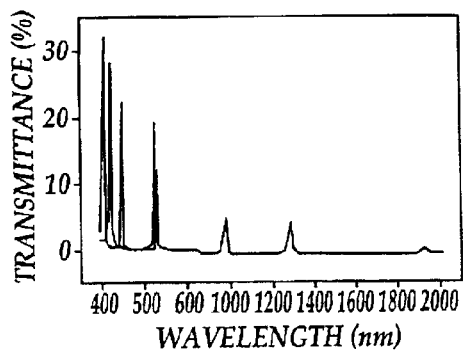
FIG. 2 shows a graph of Transmittance versus Wavelength for a silver/silicon dioxide/silver Fabry-Perot filter which may be employed within a Fabry-Perot filter apparatus in accord with the present invention.

Referring now to FIG. 2, there is shown a graph of Transmittance versus Wavelength for a Fabry-Perot filter formed of: (1) a silicon dioxide interferometric spacer layer of thickness about 4000 angstroms, in turn having formed upon a first of its sides; (2) a first partially reflective silver layer formed to a thickness of about 400 angstroms and further in turn having formed upon the other of its sides; (3) a second partially reflective silver layer formed to a thickness of about 40 angstroms.

As is illustrated within the graph of FIG. 2, there are several transmission peaks within the 400 nanometer to 700 nanometer wavelength range which may hamper efficient and precise detection and quantification of a sample which is analyzed while employing a Fabry-Perot filter apparatus having assembled therein a Fabry-Perot filter whose transmittance characteristics are illustrated within the graph of FIG. 2.

Figure 3:
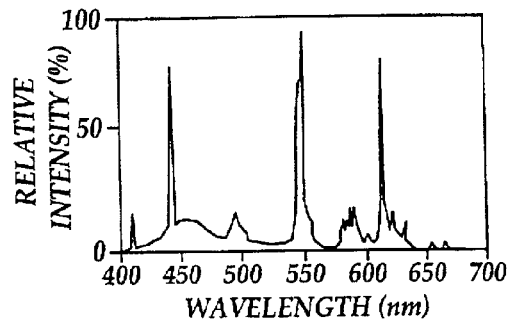
FIG. 3 shows a graph of Relative Intensity versus Wavelength for a white light visible light source which may be employed within a Fabry-Perot filter apparatus in accord with the present invention.

Referring now to FIG. 3, there is shown a graph of Relative Intensity versus Wavelength for a typical white light radiation source which may be employed as an illumination source within a Fabry-Perot filter apparatus in accord with the present invention.

As is illustrated within the graph of FIG. 3, the white light radiation source has major spectral emission peaks at about 440 nanometers, 550 nanometers and 625 nanometers which may hamper efficient and precise detection and quantification of a sample which is analyzed while employing a Fabry-Perot filter apparatus having assembled therein a Fabry-Perot filter whose transmittance characteristics are illustrated within the graph of FIG. 2 and a white light radiation source whose emission characteristics are illustrated within the graph of FIG. 3.

Figure 4:
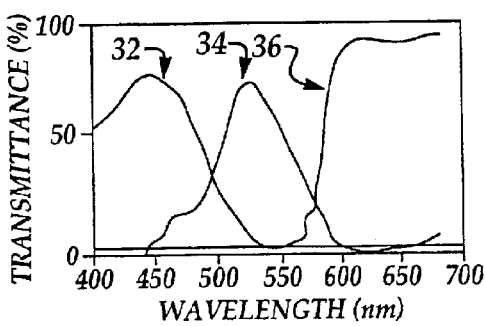
FIG. 4 shows a graph of Transmittance versus Wavelength for a series of color filter elements which may be employed within a color filter layer within a Fabry-Perot filter apparatus in accord with the present invention.

Referring now to FIG. 4, there is shown a graph of Transmittance versus Wavelength for a series of color filter elements within a color filter layer which may be employed within a Fabry-Perot filter apparatus in accord with the present invention when the Fabry-Perot filter apparatus employs: (1) a Fabry-Perot filter of transmittance characteristics in accord with the graph of FIG. 2; and (2) a white light radiation source of emission characteristics in accord with the graph of FIG. 3.

As is illustrated within the graph of FIG. 4, the curve which corresponds with reference numeral 32 corresponds with a color filter element which allow transmittance of blue light. Similarly, the curve which corresponds with reference numeral 34 corresponds with a color filter element which allows for transmittance of green light. Finally, the curve which corresponds with reference numeral 36 corresponds with a color filter element which allows for transmittance of red light.

Figure 5A:
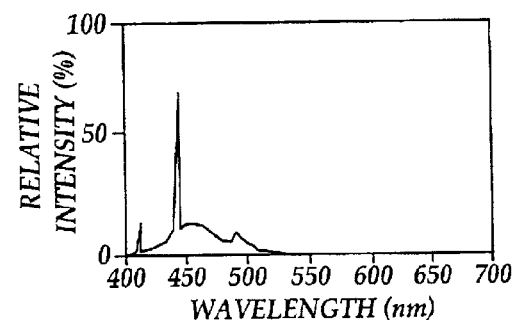
FIG. 5A, FIG. 5B and FIG. 5C show a series of graphs of Relative Intensity versus Wavelength for the white light visible light source which may be employed within the Fabry-Perot apparatus in accord with the graph of FIG. 3 after having incorporated therein the color filter layer having formed therein the series of color filter elements in accord with the graph of FIG. 4.
Figure 5B:
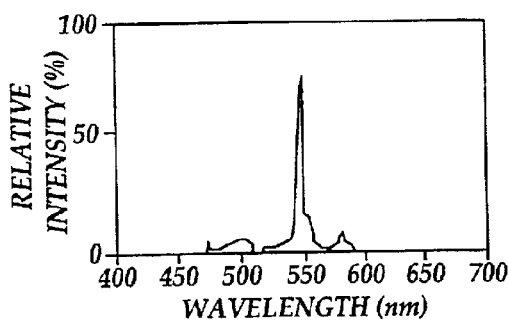
Figure 5C:
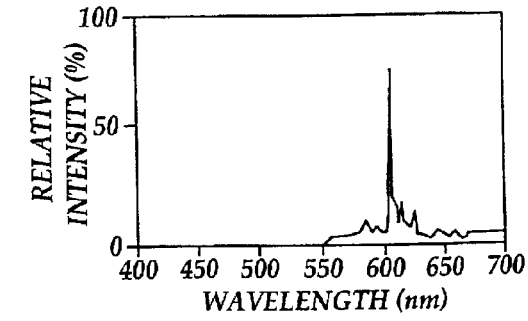

Referring now to FIG. 5A, FIG. 5B and FIG. 5C, there is shown a series of graphs of Relative Intensity versus Wavelength derived from the graph of FIG. 3 incident to having been filtered by individual color filter elements whose spectral characteristics are illustrated within the graph of FIG. 4.

As is illustrated within the graphs of FIG. 5A, FIG. 5B and FIG. 5C, filtering by the individual color filter elements whose spectral characteristics are illustrated within the graph of FIG. 4 of a white light radiation source in accord with the graph of FIG. 3 provides for an individual discrimination of the major peaks within the graph of FIG. 3. Thus, incident to such color filter element discrimination there may be independently normalized with respect to each other the individual peak intensities for the peaks as illustrated within the graphs of FIG. 5A, FIG. 5B and FIG. 5C, such as to more efficiently and accurately determine incident radiation intensities. Similarly, by accurately determining, classifying and normalizing incident radiation intensities and characteristics, there may also more efficiently and accurately be determined sample emission or absorption intensities and characteristics, for a sample which is analyzed within a Fabry-Perot apparatus in accord with the present invention (i.e., a more accurate determination of incident radiation properties provides for a more accurate determination of sample properties, since sample properties are less likely to be obscured by incident radiation properties which are poorly quantified or characterized).

As is understood by a person skilled in the art, the preferred embodiment and example of the present invention are illustrative of the present invention rather than limiting of the present invention. Revisions and modifications may be made to materials, structures and dimensions employed for fabricating a Fabry-Perot filter apparatus in accord with the preferred embodiment and example of the present invention, while still providing a Fabry-Perot filter apparatus in accord with the present invention, further in accord with the accompanying claims.

What is claimed is:

1. A Fabry-Perot filter apparatus comprising:
    a substrate having formed therein at least two optical transducer elements;
    a Fabry-Perot filter assembled over the substrate and covering the at least two optical transducer elements, the Fabry-Perot filter comprising a pair of partially reflective layers separated by a transparent material; and
    at least one color filter layer also assembled over the substrate and covering the at least two optical transducer elements, the at least one color filter layer comprising at least two color filter elements of separate color, each registered with a separate optical transducer element within the at least two optical transducer elements.

2. The apparatus of claim 1 wherein the optical transducer element is an optical emitter element.

3. The apparatus of claim 1 wherein the optical transducer element is an optical sensor element.

4. The apparatus of claim 1 wherein the substrate is a semiconductor substrate and the optical transducer element is a semiconductor optical sensor element.

5. The apparatus of claim 1 wherein the pair of partially reflective layers is separated by a fixed distance.

6. The apparatus of claim 1 wherein the pair of partially reflective layers is separated by a variable distance.

7. The apparatus of claim 1 wherein each color filter element is separated from a corresponding optical transducer element by a single actual separation distance.

8. The apparatus of claim 1 wherein the color filter layer is formed employing a series of separately colored patterned photoresist layers.

9. A method for fabricating a Fabry-Perot filter apparatus comprising:
    providing a substrate having formed therein at least two optical transducer elements;
    assembling over the substrate and covering the at least two optical transducer elements a Fabry-Perot filter, the Fabry-Perot filter comprising a pair of partially reflective layers separated by a transparent material; and
    assembling also over the substrate and covering the at least two optical transducer elements at least one color filter layer, the at least one color filter layer comprising at least two color filter elements of separate color, each registered with a separate optical transducer element within the at least two optical transducer elements.

10. The method of claim 9 wherein the optical transducer element is an optical emitter element.

11. The method of claim 9 wherein the optical transducer element is an optical sensor element.

12. The method of claim 9 wherein the substrate is a semiconductor substrate and the optical transducer element is a semiconductor optical sensor element.

13. The method of claim 9 wherein the pair of partially reflective layers is separated by a fixed distance.

14. The method of claim 9 wherein the pair of partially reflective layers is separated by a variable distance.

15. The method of claim 9 wherein each color filter element is separated from a corresponding optical transducer element by a single actual separation distance.

16. The method of claim 9 wherein the color filter layer is formed employing a series of separately colored patterned photoresist layers.

17. A method for operating a Fabry-Perot filter apparatus comprising:
   providing a Fabry-Perot filter apparatus comprising:
      a substrate having formed therein at least two optical sensor transducer elements;
      a Fabry-Perot filter assembled over the substrate and covering the at least two optical sensor transducer elements, the Fabry-Perot filter comprising a pair of partially reflective layers separated by a transparent material;
      at least one color filter layer also assembled over the substrate and covering the at least two optical sensor transducer elements, the at least one color filter layer comprising at least two color filter elements of separate color, each registered with a separate optical sensor transducer element within the at least two optical sensor transducer elements;
      a sample chamber assembled over the Fabry-Perot filter and the at least one color filter layer; and
      a radiation source located such as to illuminate a sample within the sample chamber;

introducing the sample into the sample chamber and illuminating the sample within the sample chamber; and analyzing the sample incident to a comparison of a photoelectric effect difference between the at least two optical sensor transducer elements.

18. The method of claim 17 wherein the substrate is a semiconductor substrate and the optical sensor transducer element is a semiconductor optical sensor transducer element.

19. The method of claim 17 wherein the pair of partially reflective layers is separated by a fixed distance.

20. The method of claim 17 wherein the pair of partially reflective layers is separated by a variable distance.

21. The method of claim 17 wherein each color filter element is separated from a corresponding optical transducer element by a single actual separation distance.

22. The method of claim 17 wherein the color filter layer is formed employing a series of separately colored patterned photoresist layers.

* * * * *